United States Patent
Gall et al.

(10) Patent No.: US 11,548,081 B2
(45) Date of Patent: Jan. 10, 2023

(54) POWERED THREADED ROD CUTTER

(71) Applicant: MILWAUKEE ELECTRIC TOOL CORPORATION, Brookfield, WI (US)

(72) Inventors: Simon M. Gall, West Bend, WI (US); Terry L. Timmons, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 293 days.

(21) Appl. No.: 16/272,212

(22) Filed: Feb. 11, 2019

(65) Prior Publication Data

US 2019/0247937 A1  Aug. 15, 2019

Related U.S. Application Data

(60) Provisional application No. 62/652,100, filed on Apr. 3, 2018, provisional application No. 62/630,431, filed on Feb. 14, 2018.

(51) Int. Cl.
*B23D 7/04* (2006.01)
*B23D 17/04* (2006.01)
(Continued)

(52) U.S. Cl.
CPC .............. *B23D 17/04* (2013.01); *B23D 21/04* (2013.01); *B23D 29/002* (2013.01); *B23D 35/007* (2013.01)

(58) Field of Classification Search
CPC ...... B23D 17/04; B23D 21/04; B23D 29/002; B23D 35/007; F16D 51/02; F16D 13/12;
(Continued)

(56) References Cited

U.S. PATENT DOCUMENTS 2,717,672 A * 9/1955 Maurer ............... B25B 23/1475
173/15
3,915,034 A * 10/1975 Ward ....................... B23Q 5/14
475/208
(Continued)

FOREIGN PATENT DOCUMENTS

DE          19515955 A1    11/1995
DE       102012215810 A1     3/2014
(Continued)

OTHER PUBLICATIONS

Dewalt, "DCS350B Rod Cutter, 1/4" to 1/2" Capacity" publicly available before Feb. 14, 2018, 1 page.
(Continued)

*Primary Examiner* — Evan H MacFarlane
*Assistant Examiner* — Liang Dong
(74) *Attorney, Agent, or Firm* — Michael Best & Friedrich LLP

(57) ABSTRACT

A powered threaded rod cutter includes first and second cutting dies, an electric motor, a planetary transmission positioned downstream of the motor, a drivetrain for converting a rotational output of the transmission to a pivoting movement of the first cutting die, and a clutch mechanism for redirecting torque from the motor away from a drivetrain and the first cutting die in response to the first cutting die seizing during a rod-cutting operation. The clutch mechanism includes a ring gear in the planetary transmission, and a spring that rotationally affixes the ring gear below a predetermined threshold of reaction torque through the drivetrain and permits rotation of the ring gear above the threshold.

16 Claims, 10 Drawing Sheets

(51) Int. Cl.
  *B23D 21/04* (2006.01)
  *B23D 35/00* (2006.01)
  *B23D 29/00* (2006.01)

(58) Field of Classification Search
  CPC .... F16F 1/042; F16H 35/10; F16H 2035/106; F16H 3/66
  USPC ...... 83/543, 628; 475/263–265, 301, 24–25; 192/144, 223.4; 188/134; 173/178
  See application file for complete search history.

(56) References Cited

U.S. PATENT DOCUMENTS

| | | | |
|---|---|---|---|
| 4,871,033 A * | 10/1989 | Odoni | B25D 16/003 173/178 |
| 5,080,180 A * | 1/1992 | Hansson | B25B 21/02 173/162.1 |
| 5,399,129 A * | 3/1995 | Ciolli | B25B 21/008 192/41 S |
| 5,533,415 A * | 7/1996 | Ackermann | F02N 15/046 74/7 E |
| 6,178,643 B1 | 1/2001 | Erbrick et al. | |
| 7,020,967 B2 | 4/2006 | Kimura | |
| 7,284,330 B2 | 10/2007 | Wagner | |
| 9,242,422 B2 | 1/2016 | Schweizer et al. | |
| 9,434,119 B2 | 9/2016 | Schweizer et al. | |
| 9,573,263 B2 | 2/2017 | Bowles et al. | |
| 9,573,335 B2 | 2/2017 | Schweizer et al. | |
| 2007/0137455 A1 | 6/2007 | Watkins | |
| 2008/0168667 A1 | 7/2008 | Spinato | |
| 2009/0102407 A1 | 4/2009 | Klemm et al. | |
| 2011/0005084 A1 * | 1/2011 | Thorson | B23D 21/04 30/95 |
| 2013/0055575 A1 * | 3/2013 | Delmas | A01G 3/037 30/228 |
| 2014/0342655 A1 * | 11/2014 | Boom | B60K 11/08 454/313 |
| 2016/0031072 A1 * | 2/2016 | Lim | B25F 5/001 173/178 |
| 2016/0101477 A1 * | 4/2016 | Parks | B23D 29/002 83/694 |
| 2016/0221200 A1 | 8/2016 | Winkel et al. | |
| 2017/0021435 A1 | 1/2017 | Parks et al. | |
| 2018/0021840 A1 | 1/2018 | Thorson et al. | |

FOREIGN PATENT DOCUMENTS

| | | |
|---|---|---|
| WO | 2006096172 A1 | 9/2006 |
| WO | 2008046973 A1 | 4/2008 |
| WO | 2012033540 A2 | 3/2012 |

OTHER PUBLICATIONS

Hitatchi, "CL18DSL, 18V Cordless Stud Cutter" publicly available before Feb. 14, 2018, 1 page.
Klauke, "ESG 25 Battery Powered Hydraulic Cutting Tool 25 mm dia." publicly available before Feb. 14, 2018, 1 page.
Makita, "Rechargeable All Screw Cutter Model SC101D Instruction Manual" publicly available before Feb. 14, 2018, 32 pages.
International Search Report and Written Opinion for Application No. PCT/US2019/017447, dated May 29, 2019, 11 pages.
International Preliminary Report on Patentability for Application No. PCT/US2019/017447 dated Aug. 18, 2020 (9 pages).

* cited by examiner

POWERED THREADED ROD CUTTER

CROSS-REFERENCE TO RELATED APPLICATIONS

This application claims priority to U.S. Provisional Patent Application No. 62/652,100 filed on Apr. 3, 2018 and U.S. Provisional Patent Application No. 62/630,431 filed on Feb. 14, 2018, the entire contents of both of which are incorporated herein by reference.

FIELD OF THE INVENTION

The present invention relates to power tools, and more particularly to powered threaded rod cutters.

BACKGROUND OF THE INVENTION

Powered threaded rod cutters are used to cut threaded rods. During operation, a moveable die of the cutter may become seized, thereby directed torque onto various components of the cutter (e.g., motor, transmission, etc.). During such instances, the various components of the cutter may be damaged.

SUMMARY OF THE INVENTION

The present invention provides, in one aspect, a powered threaded rod cutter including first and second cutting dies, an electric motor, a planetary transmission positioned downstream of the motor, a drivetrain for converting a rotational output of the transmission to a pivoting movement of the first cutting die, and a clutch mechanism for redirecting torque from the motor away from a drivetrain and the first cutting die in response to the first cutting die seizing during a rod-cutting operation. The clutch mechanism includes a ring gear in the planetary transmission, and a spring that rotationally affixes the ring gear below a predetermined threshold of reaction torque through the drivetrain and permits rotation of the ring gear above the threshold.

The present invention provides, in another aspect, a powered threaded rod cutter including an electric motor, a trigger operable by a user to activate the motor, a cam that receives torque from the electric motor when the motor is activated, causing the cam to rotate, a follower having a moveable cutting die attached thereto that is pivoted in response to being driven by the cam to perform rod-cutting operations, and a sensor configured to detect a rotational position of the cam for deactivating the motor after completion of one cycle of a rod-cutting operation.

The present invention provides, in another aspect, a powered threaded rod cutter including an electric motor, a planetary transmission positioned downstream of the motor, a drivetrain for converting a rotational output of the transmission to a pivoting movement of a moveable die. The drivetrain includes a cam that receives torque from the electric motor causing the cam to rotate, a follower having the moveable die attached thereto that is pivoted in response to being driven by the cam to perform rod-cutting operations, and a sensor configured to detect a rotational position of the cam for deactivating the motor after completion of one cycle of a rod-cutting operation. In some embodiments, the powered threaded rod cutter includes a clutch mechanism for redirecting torque from the electric motor away from the drivetrain in response to the moveable die seizing during a rod-cutting operation, wherein the clutch mechanism includes a ring gear in the planetary transmission, and a spring that rotationally affixes the ring gear below a predetermined threshold of reaction torque through the drivetrain and permits rotation of the ring gear above the threshold.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
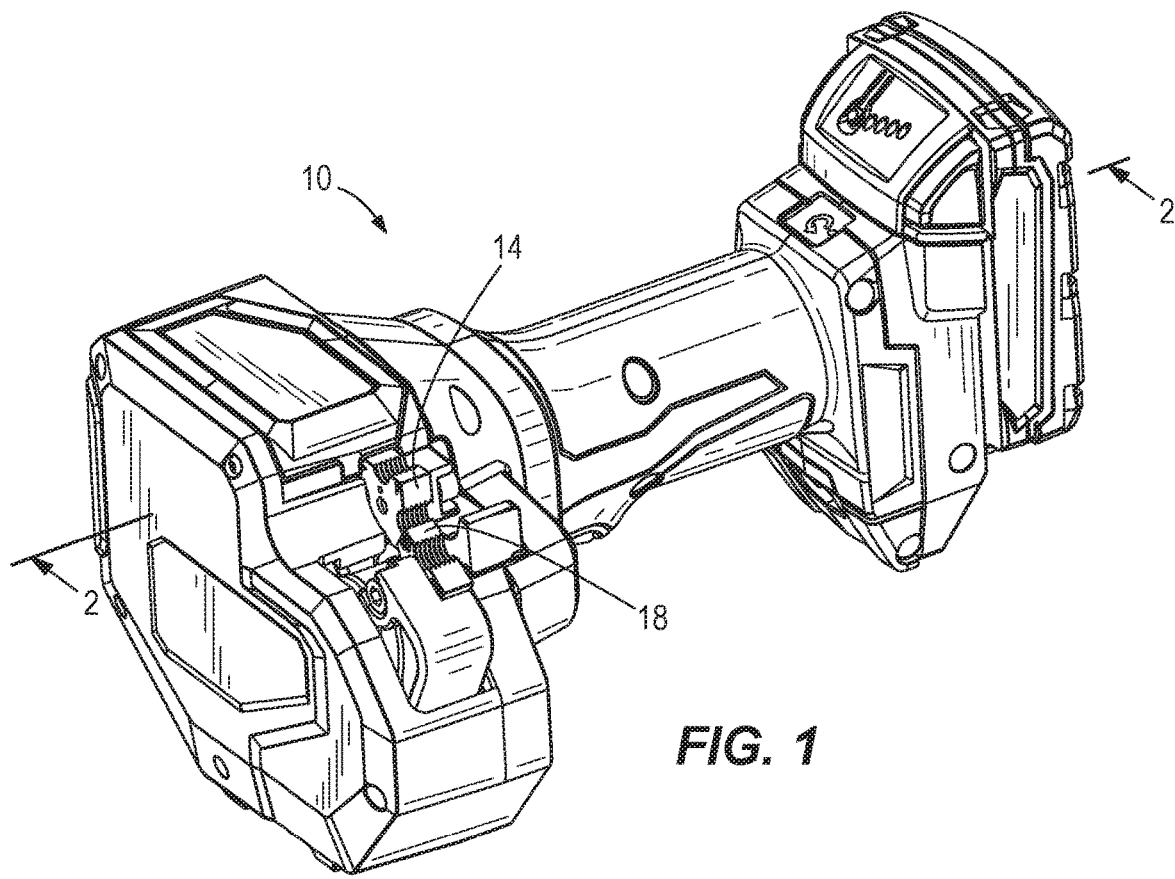
FIG. 1 is a perspective view of a powered threaded rod cutter in accordance with an embodiment of the invention.
Figure 2:
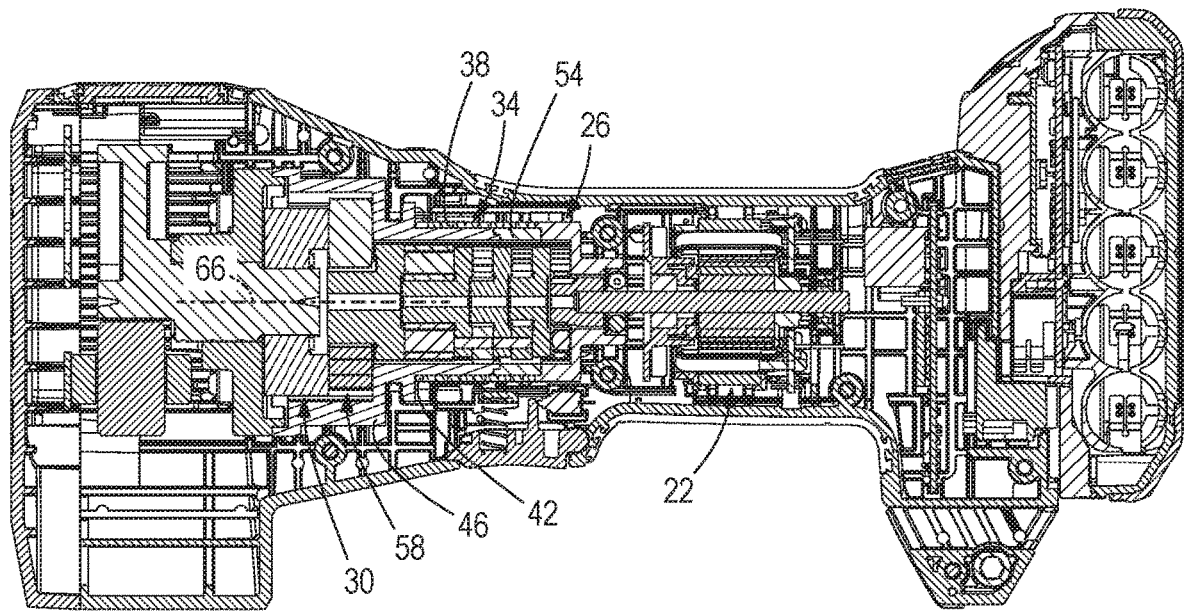
FIG. 2 is a cross-sectional view of the powered threaded rod cutter of FIG. 1.

With reference to FIG. 1, a powered threaded rod cutter 10 includes a stationary die 14 and a movable die 18 located on the side of the cutter 10. The cutter 10 includes an electric motor 22 (FIG. 2), a multi-stage planetary transmission 26 downstream of the motor 22, and a drivetrain 30 for converting the rotational output of the transmission 26 to a pivoting movement of the movable die 18 during a rod-cutting operation (FIG. 2). To prevent damage to the motor 22, transmission 26, and drivetrain 30 should the movable die 18 become seized during a rod-cutting operation, the cutter 10 includes a clutch mechanism 34 that redirects torque from the motor 22 away from the drivetrain 30 in response to a predetermined torque threshold being reached.

Figure 3:
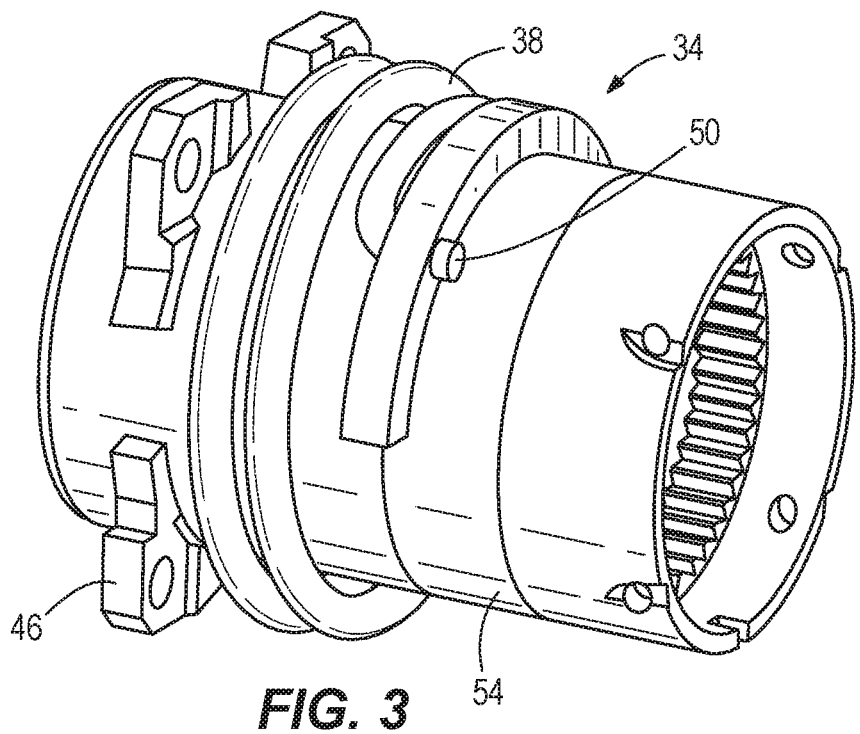
FIG. 3 is a perspective view of a clutch mechanism of the powered threaded rod cutter of FIG. 1.
Figure 4:
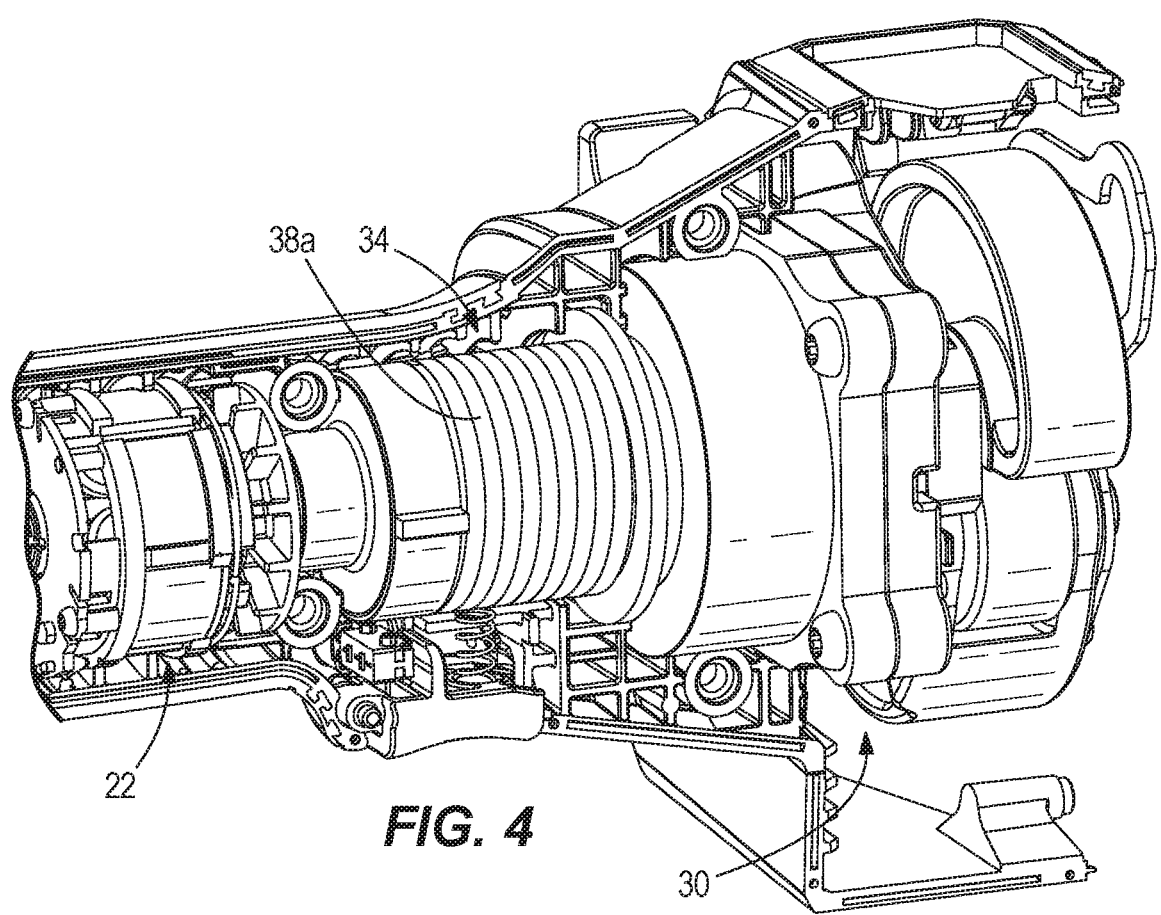
FIG. 4 is a cutaway perspective view of the powered threaded rod cutter of FIG. 1.
Figure 5:
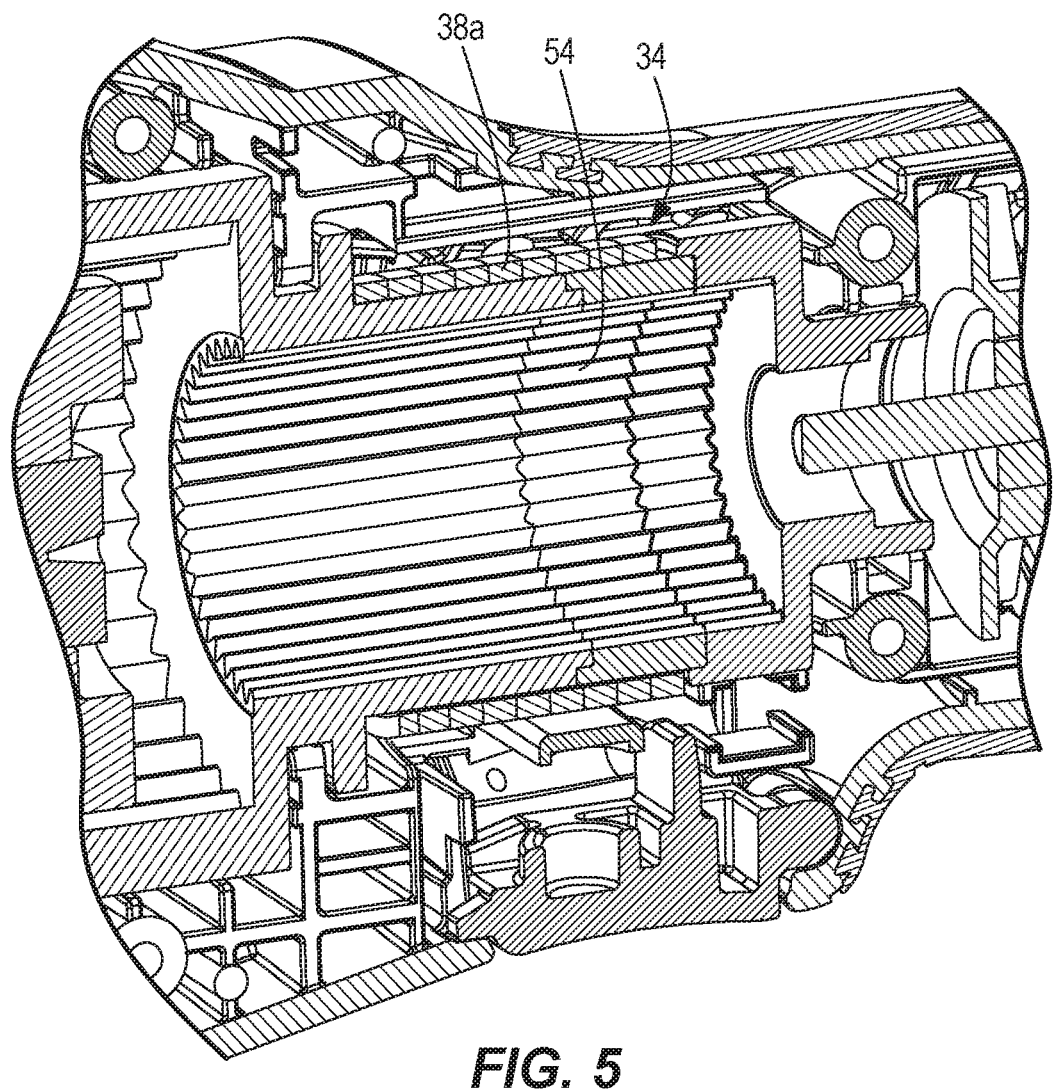
FIG. 5 is a cutaway perspective view of the powered threaded rod cutter of FIG. 1, with portions removed.
Figure 6:
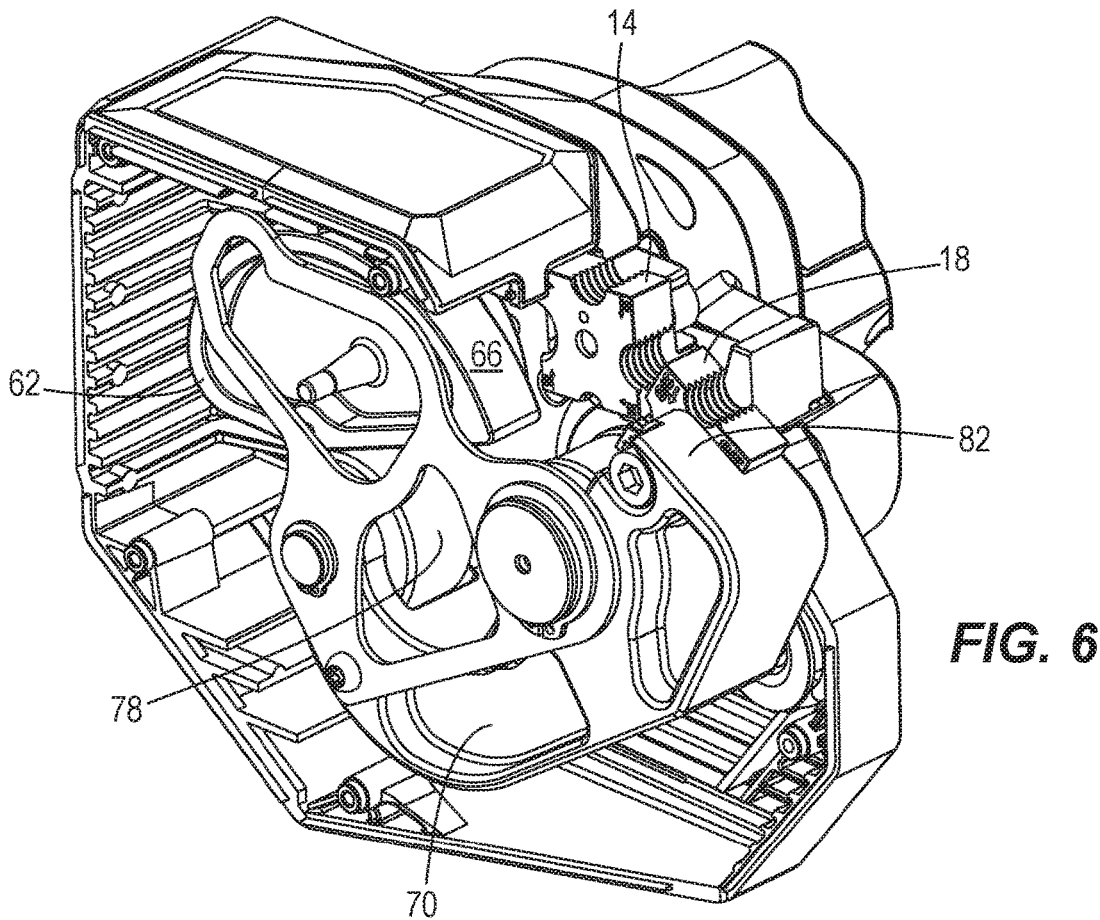
FIG. 6 is a perspective cutaway view of the powered threaded rod cutter of FIG. 1.

The clutch mechanism 34 includes a spring (e.g., a torsion spring 38) having one end 42 secured to a transmission housing 46 and an opposite end 50 secured to the second-stage ring gear 54 of the transmission 26, which is also a component of the clutch mechanism 34 (FIG. 3). As such, the torsion spring 38 rotationally affixes the ring gear 54 relative to the transmission housing 46 below the predetermined torque threshold. When the reaction torque through the drivetrain 30 exceeds the predetermined torque threshold in response to the movable die 18 seizing during a rod-cutting operation, torque from the motor 22 is redirected within the transmission 26 to the second stage ring gear 54, causing it to rotate relative to the transmission housing 46 against the bias of the torsion spring 38. As such, no further torque is applied to the drivetrain 30 or the movable die 18, preventing any subsequent damage. The onboard electronics of the cutter 10 detect that the predetermined torque threshold has been exceeded, and in response deactivates the motor 22. As such, the clutch mechanism 34 does not rely on the onboard electronics of the cutter 10 to protect the drivetrain 30 or moveable die 18 from damage. Alternatively, as shown in FIGS. 4 and 5, the spring may be configured as a square wire wrap spring 38a.

Figure 7:
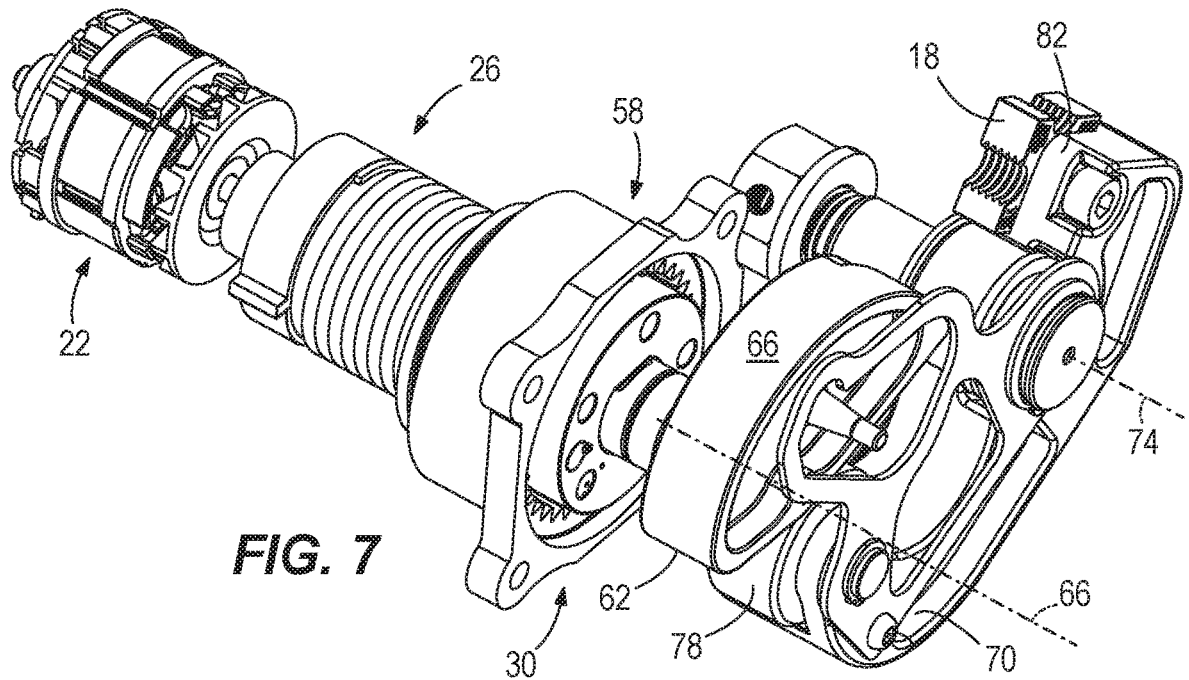
FIG. 7 is a perspective view of a transmission and drivetrain of the powered threaded rod cutter of FIG. 1.

As shown in FIGS. 2 and 7, the drivetrain 30 includes an additional planetary transmission stage 58, the output of which rotates a cam lobe 62 about a rotational axis 66. The cutter 10 also includes a follower arm 70 pivotably coupled to the transmission housing 46 about a pivot axis 74 that is parallel with the rotational axis 66 of the cam lobe 62 (FIGS. 2 and 8A-8E). The follower arm 70 includes, on one side of the pivot axis 74, a roller 78 in contact with the cam lobe 62 and, on an opposite side of the pivot axis 74, a mount 82 to which the movable die 18 is fastened (FIG. 7).

Figure 8A:
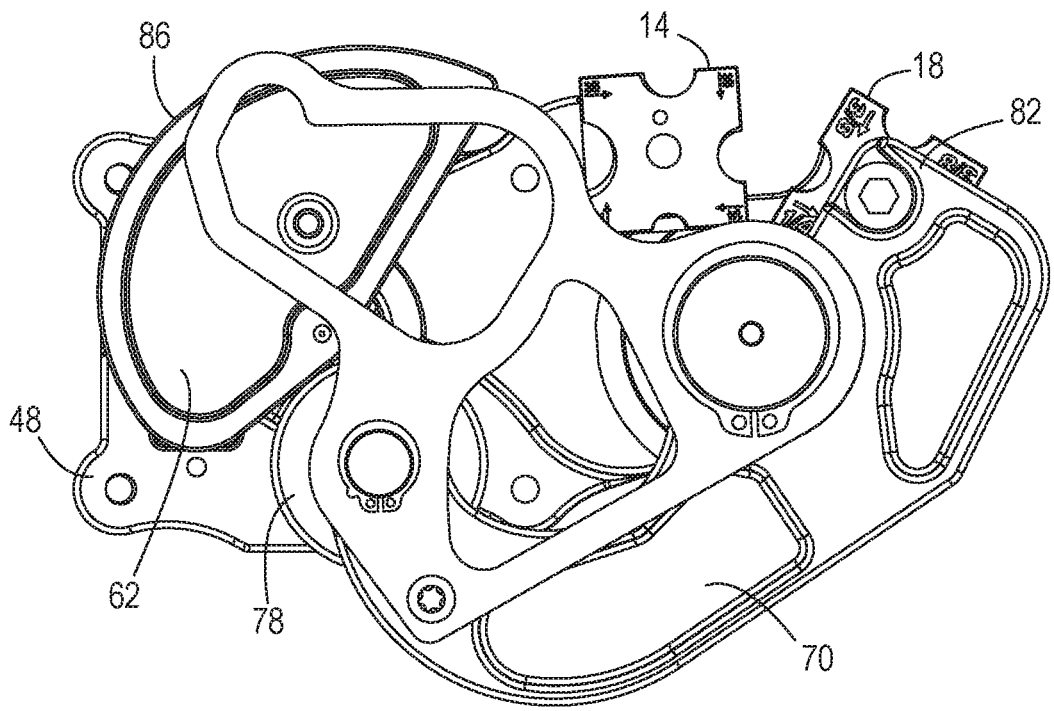
FIG. 8A is a cross-sectional view of the drivetrain during operation of the powered threaded rod cutter of FIG. 1, illustrating the drivetrain in a first position.
Figure 8B:
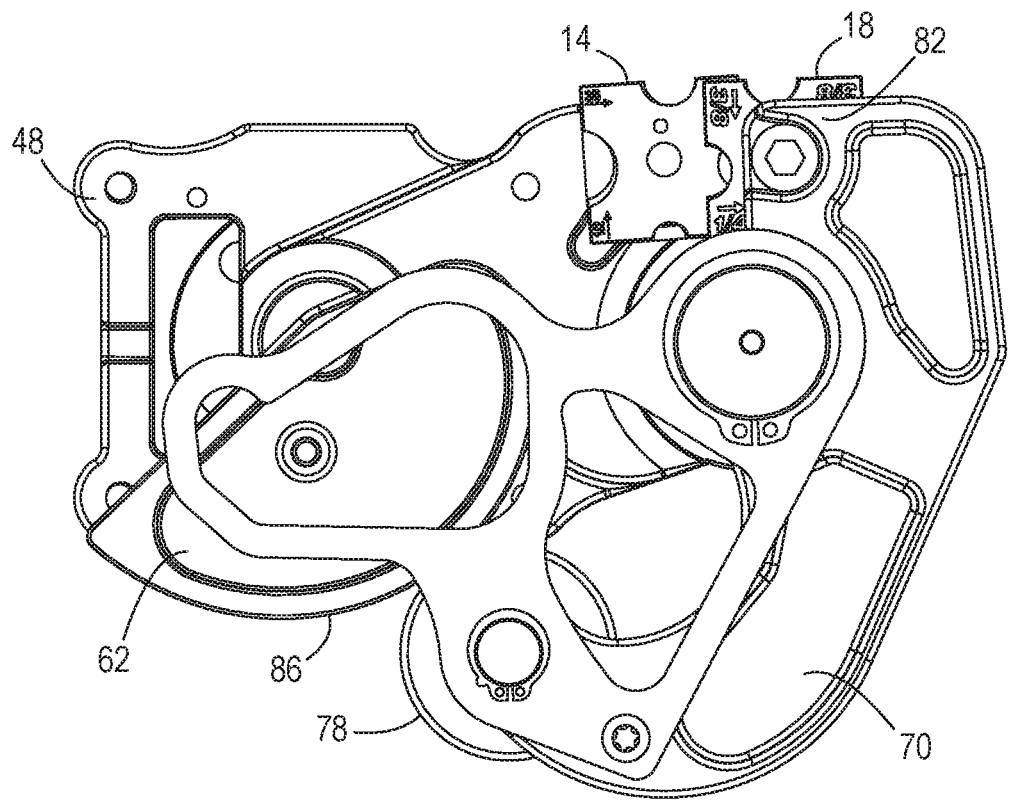
FIG. 8B is a cross-sectional view of the drivetrain during operation of the powered threaded rod cutter of FIG. 1, illustrating the drivetrain in a second position.
Figure 8C:
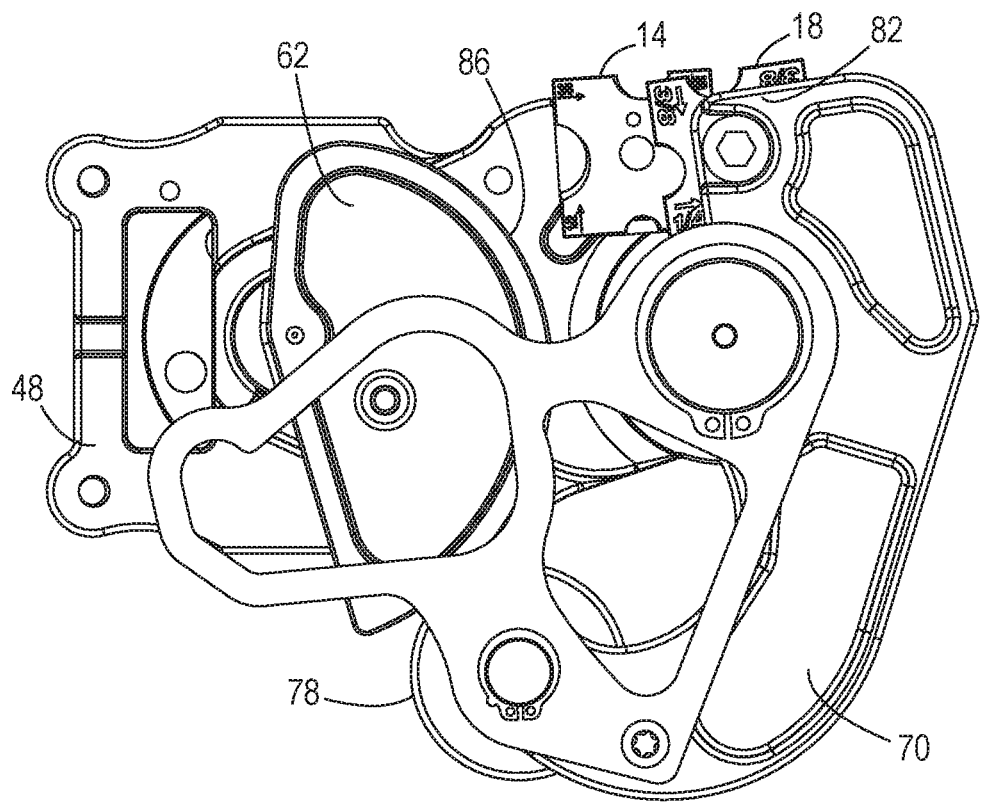
FIG. 8C is a cross-sectional view of the drivetrain during operation of the powered threaded rod cutter of FIG. 1, illustrating the drivetrain in a third position.
Figure 8D:
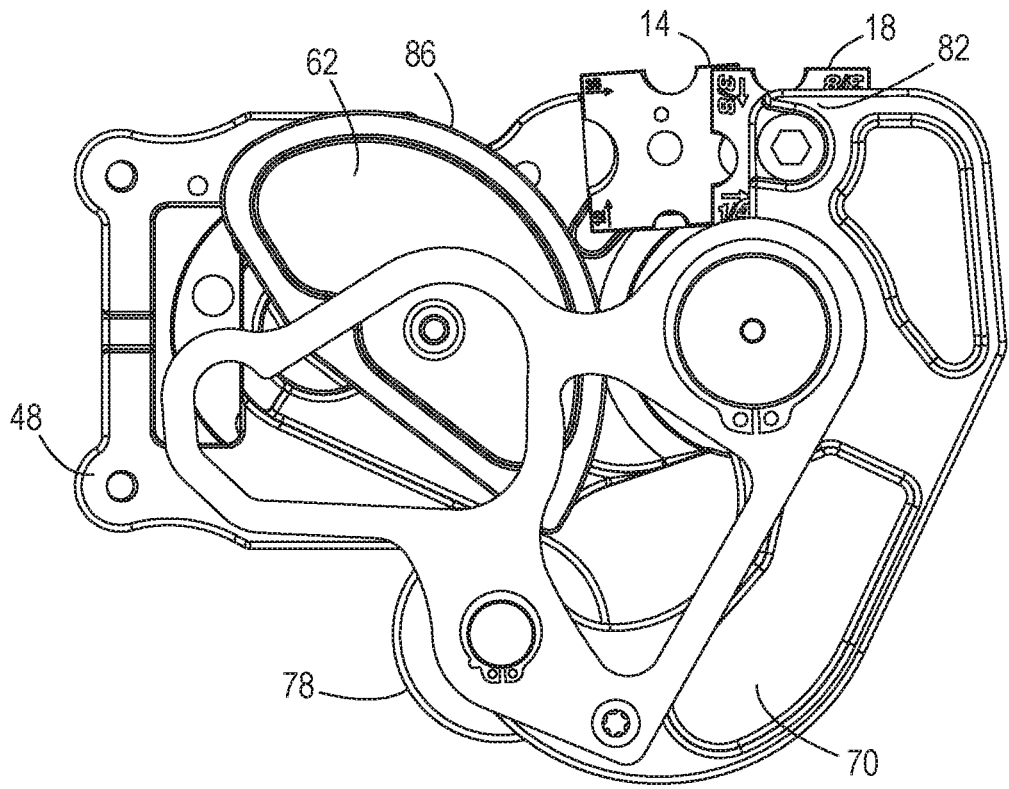
FIG. 8D is a cross-sectional view of the drivetrain during operation of the powered threaded rod cutter of FIG. 1, illustrating the drivetrain in a fourth position.
Figure 8E:
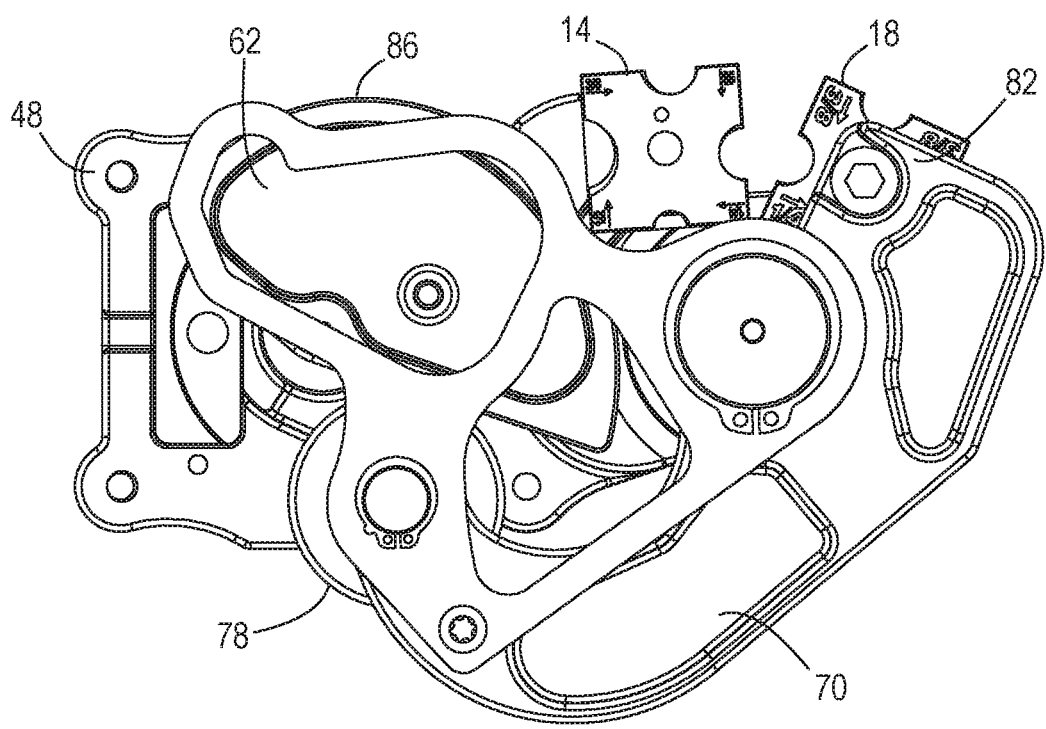
FIG. 8E is a cross-sectional view of the drivetrain during operation of the powered threaded rod cutter of FIG. 1, illustrating the drivetrain in a fifth position.

When the user pulls the trigger of the cutter 10, the movable die 18 is moved toward the stationary die 14, cutting the threaded rod located between the dies 14, 18. After the cut is completed (coinciding with release of the trigger), the movable die 18 cycles away from the stationary die 14 to a home position, at which time the motor 22 automatically stops. Specifically, in the sequence shown in FIGS. 8A and 8B, the cam lobe 62 is rotated about its axis 66 in a counter-clockwise direction, displacing the roller 78 away from the axis 66 and causing the follower arm 70 to pivot about its axis 74 in a counter-clockwise direction, thus closing the gap between the dies 14, 18 to perform the rod-cutting operation (FIG. 8C). At FIG. 8D, the roller 78 disengages a driving surface 86 of the cam lobe 62, permitting a torsion spring (not shown) acting on the follower arm 70 to rebound and pivot the follower arm 70 in a clockwise direction, thus reopening the gap between the dies 14, 18 (sequence shown in FIGS. 8D to 8E). The cam lobe 62 continues to rotate in a counter-clockwise direction and is returned to the position shown in FIG. 8A, after which the motor 22 is deactivated to complete one cycle of a rod-cutting operation.

Figure 9:
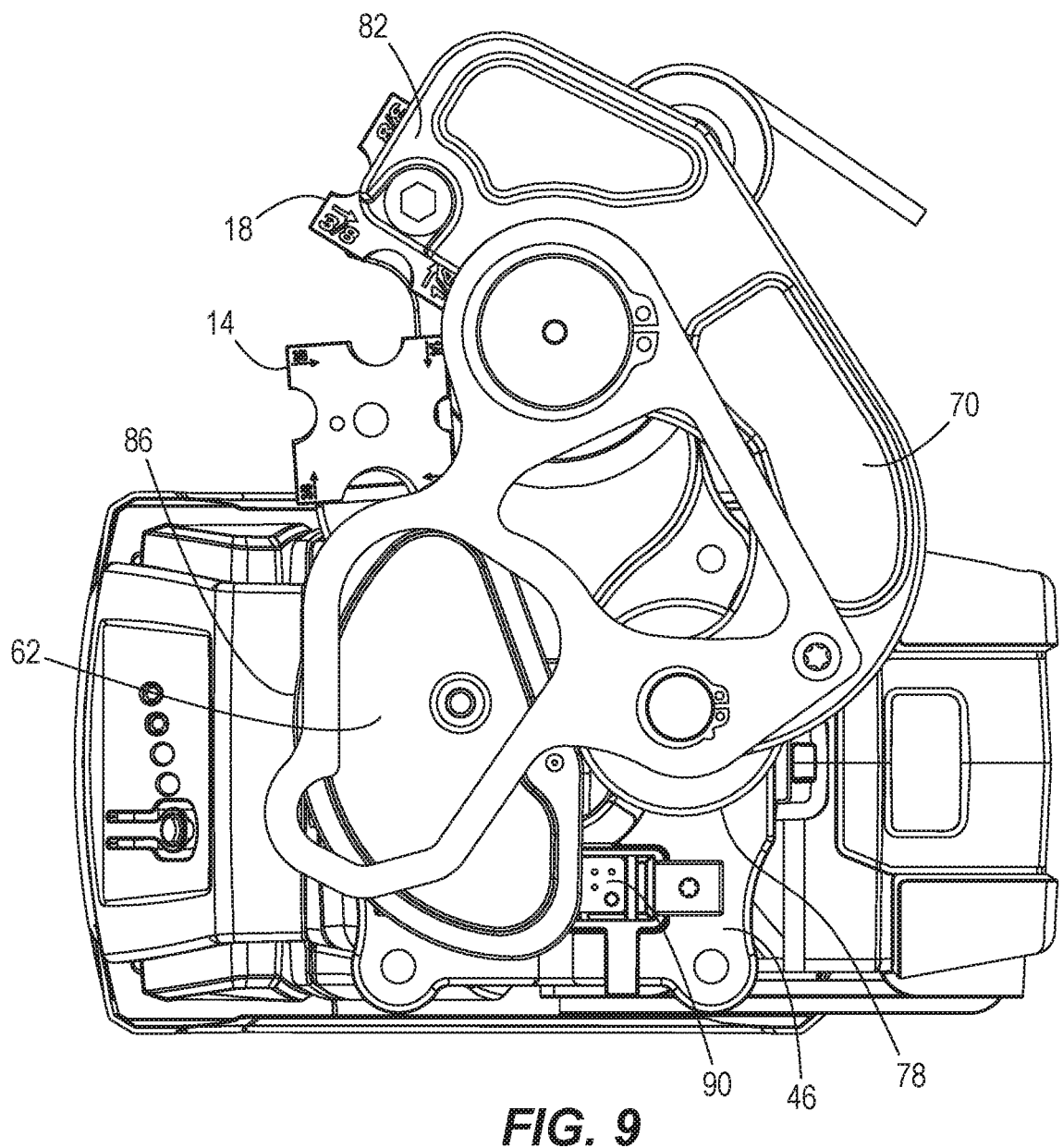
FIG. 9 is a cross-sectional view of the drivetrain, illustrating a Hall-effect sensor for detecting the position of the drivetrain.
Figure 10:
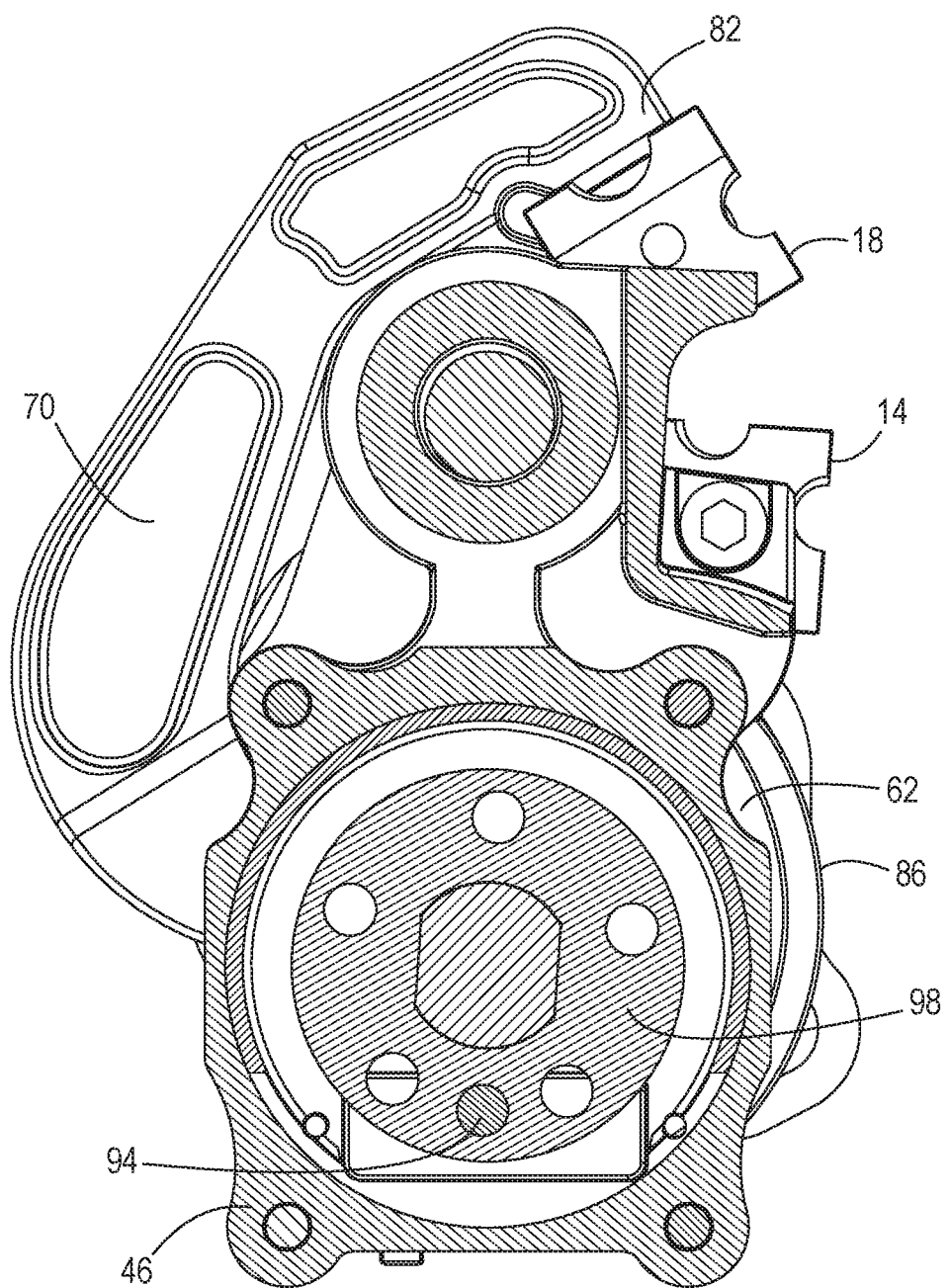
FIG. 10 is a cross-sectional view of the drivetrain, illustrating a magnet that interfaces with the Hall-effect sensor of FIG. 9.
Figure 11:
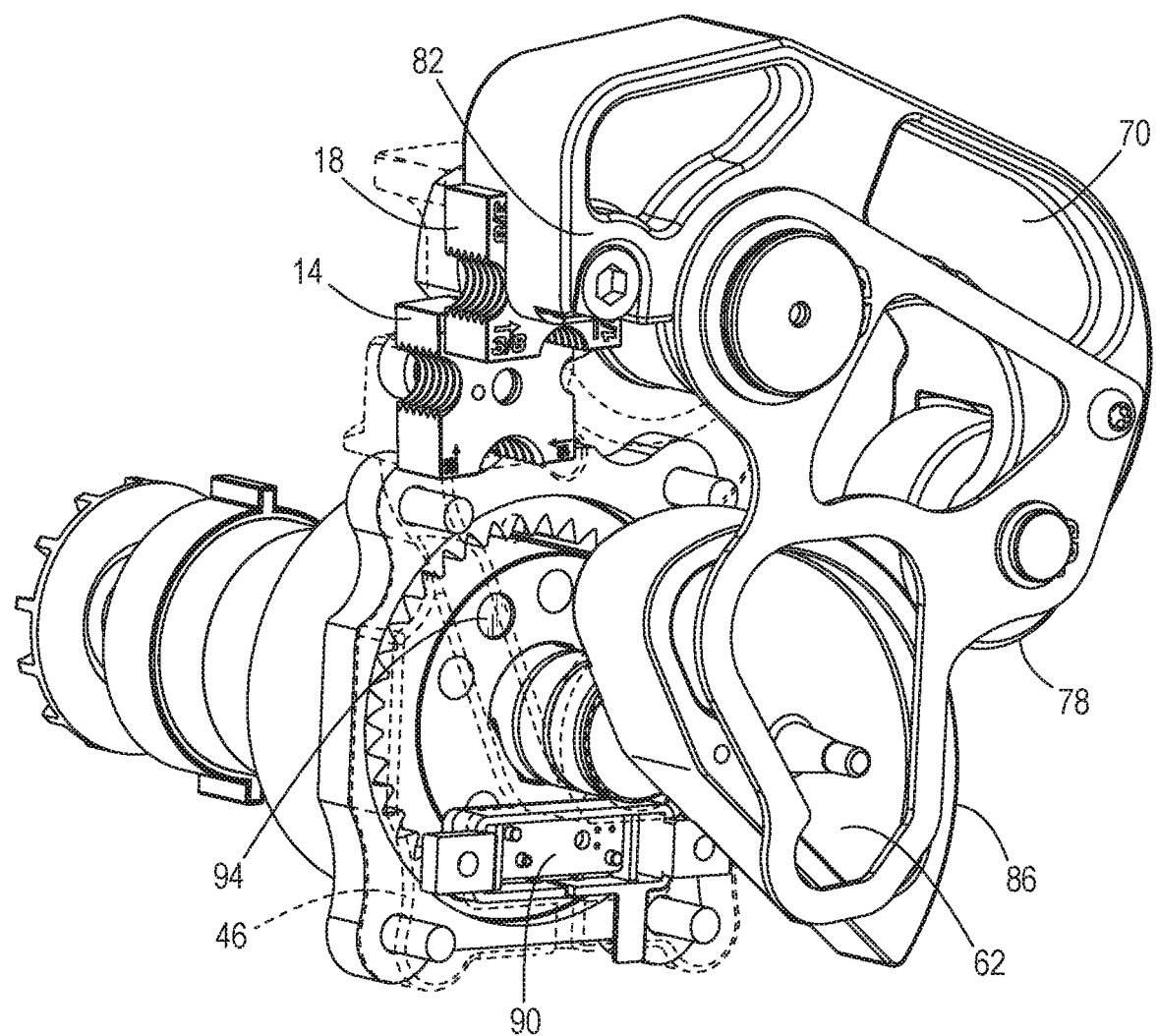
FIG. 11 is a perspective view of the drivetrain about one-half way through a drive cycle, illustrating the location of the magnet relative to the Hall-effect sensor.

FIGS. 9 and 11 illustrate a Hall-effect sensor 90 mounted to the transmission housing 46 for detecting the position of the drivetrain 30 coinciding with completion of one cycle of a rod-cutting operation. In the illustrated embodiment of the cutter 10, a magnet 94 is attached to a rotational member 98 of the transmission 26 (e.g., a final stage planet carrier; FIG. 10). Alternatively, the magnet 94 may be positioned directly on the cam lobe 62, the follower arm 70, or another component of the drivetrain 30. The Hall-effect sensor 90 detects the magnet 94 when the rotational member 98 (with the attached magnet 94) reaches a position that corresponds to the moveable die 18 reaching the home position shown in FIG. 8E. In response to detecting the magnet 94, the Hall-effect sensor 90 sends a signal to a controller (not shown), which would then deactivate the motor 22 as mentioned above coinciding with completion of one cycle of a rod-cutting operation, stopping the movable die 18 in the home position shown in FIG. 8E, and readying the cutter 10 for the next rod-cutting operation. Alternatively, should the current drawn by the motor 22 exceed a predetermined threshold during a rod-cutting operation (possibly coinciding with seizure of the movable die 18), the controller may reverse the rotational direction of the motor 22 to return the movable die 18 to the home position shown in FIG. 8E. The rotational position of the cam lobe 62 is detected by the Hall-effect sensor 90 as described above. Upon the cam lobe 62 reaching the position shown in FIG. 8E, the controller deactivates the motor 22, readying the cutter 10 for a subsequent rod-cutting operation.

Various features of the invention are set forth in the following claims.

What is claimed is:

1. A powered threaded rod cutter comprising:
    first and second cutting dies;
    an electric motor;
    a planetary transmission positioned downstream of the motor;
    a drivetrain for converting a rotational output of the transmission to a pivoting movement of the first cutting die; and
    a clutch mechanism for redirecting torque from the motor away from the drivetrain and the first cutting die in response to the first cutting die seizing during a rod-cutting operation, wherein the clutch mechanism includes
      a ring gear in the planetary transmission, and
      a spring that rotationally affixes the ring gear relative to a transmission housing below a predetermined threshold of reaction torque through the drivetrain and permits rotation of the ring gear above the threshold.

2. The powered threaded rod cutter of claim 1, wherein the spring is a torsion spring including a first end secured to the transmission housing and a second end secured to the ring gear.

3. The powered threaded rod cutter of claim 2, wherein the transmission is a multi-stage planetary transmission, and wherein the ring gear is in a second planetary stage of the transmission.

4. The powered threaded rod cutter of claim 2, wherein the ring gear is rotatable relative to the transmission housing in response to the reaction torque through the drivetrain exceeding the predetermined threshold, thereby storing energy in the torsion spring.

5. The powered threaded rod cutter of claim 4, further comprising a controller configured to activate and deactivate the motor, and to monitor current drawn by the motor when activated.

6. The powered threaded rod cutter of claim 5, wherein the controller is operable to deactivate the motor in response to the current drawn by the motor exceeding a predetermined current threshold.

7. The powered threaded rod cutter of claim 6, wherein in response to the reaction torque through the drivetrain exceeding the predetermined threshold, in sequence, the ring gear is rotated relative to the transmission housing to store energy in the torsion spring and then the motor is deactivated by the controller.

8. The powered threaded rod cutter of claim 2, wherein the torsion spring is wrapped around the transmission housing.

9. The powered threaded rod cutter of claim 1, wherein the spring is a square wire wrap spring.

10. The powered threaded rod cutter of claim 1, further comprising a sensor configured to detect a position of the drivetrain coinciding with completion of one cycle of a rod-cutting operation.

11. The powered threaded rod cutter of claim 10, wherein the sensor is a Hall-effect sensor, wherein the powered threaded rod cutter further comprises a magnet attached to a rotational member of the drivetrain, and wherein the Hall-effect sensor detects a rotational position of the rotational member.

12. The powered threaded rod cutter of claim 11, further comprising a trigger operable by a user to activate the motor an initiate a rod-cutting operation, wherein the motor is deactivated in response to the Hall-effect sensor detecting the magnet after one revolution of the rotational member.

13. A powered threaded rod cutter comprising:
an electric motor;
a trigger operable by a user to activate the motor;
a cam that receives torque from the electric motor when the motor is activated, causing the cam to rotate;
a follower having a moveable cutting die attached thereto that is pivoted in response to being driven by the cam to perform rod-cutting operations;
a drivetrain positioned between the motor and the cam, the drivetrain including a rotational member;
a Hall-effect sensor configured to detect a rotational position of the rotational member or a rotational position of the cam for deactivating the motor after completion of one cycle of a rod-cutting operation;
a magnet attached to the rotational member, wherein the Hall-effect sensor detects the rotational position of the cam via the rotational member, and wherein the motor is deactivated in response to the Hall-effect sensor detecting the magnet after one revolution of the rotational member; and
a clutch mechanism for redirecting torque from the electric motor away from the cam in response to the moveable die seizing during a rod-cutting operation.

14. The powered threaded rod cutter of claim 13, wherein the clutch mechanism includes
a ring gear, and
a spring that rotationally affixes the ring gear relative to a transmission housing below a predetermined threshold of reaction torque through the drivetrain and permits rotation of the ring gear above the threshold.

15. The powered threaded rod cutter of claim 14, wherein the spring is a torsion spring including a first end secured to the transmission housing and a second end secured to the ring gear.

16. A powered threaded rod cutter comprising:
an electric motor;
a planetary transmission positioned downstream of the motor;
a drivetrain for converting a rotational output of the transmission to a pivoting movement of a moveable die, wherein the drivetrain includes
a cam that receives torque from the electric motor causing the cam to rotate,
a follower having the moveable die attached thereto that is pivoted in response to being driven by the cam to perform rod-cutting operations, and
a sensor configured to detect a rotational position of the cam for deactivating the motor after completion of one cycle of a rod-cutting operation; and
a clutch mechanism for redirecting torque from the electric motor away from the drivetrain in response to the moveable die seizing during a rod-cutting operation, wherein the clutch mechanism includes
a ring gear in the planetary transmission, and
a spring that rotationally affixes the ring gear relative to a transmission housing below a predetermined threshold of reaction torque through the drivetrain and permits rotation of the ring gear above the threshold.

* * * * *